(12) United States Patent
Robbin et al.

(10) Patent No.: US 10,664,856 B2
(45) Date of Patent: May 26, 2020

(54) BEACON-TRIGGERED CODE REDEMPTION FOR MOBILE DEVICES

(71) Applicant: Apple Inc., Cupertino, CA (US)

(72) Inventors: Gregory S. Robbin, Mountain View, CA (US); Oliver Krevet, San Jose, CA (US); Jeremy C. Norberg, Seattle, WA (US); Claes S. Nygren, Seattle, WA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 14/284,336

(22) Filed: May 21, 2014

(65) Prior Publication Data

US 2015/0339694 A1 Nov. 26, 2015

(51) Int. Cl.
*G06Q 30/02* (2012.01)
*H04W 4/80* (2018.01)

(52) U.S. Cl.
CPC .......... *G06Q 30/0207* (2013.01); *H04W 4/80* (2018.02)

(58) Field of Classification Search
CPC ........... G06Q 30/0207; G06Q 30/0252; G06Q 30/0261; G06Q 30/0267; G06Q 30/0269
See application file for complete search history.

(56) References Cited

U.S. PATENT DOCUMENTS

| | | | |
|---|---|---|---|
| 6,002,918 A | 12/1999 | Heiman | |
| 6,816,730 B2 | 11/2004 | Davies | |
| 7,010,267 B2 | 3/2006 | Vanluijt | |
| 7,397,424 B2 | 7/2008 | Houri | |
| 7,653,573 B2 | 1/2010 | Hayes | |
| 7,712,657 B1 | 5/2010 | Block | |
| 7,856,234 B2 | 12/2010 | Alizadeh-Shabdiz et al. | |
| 7,890,116 B2 | 2/2011 | Salokannel | |

(Continued)

FOREIGN PATENT DOCUMENTS

| | | |
|---|---|---|
| EP | 2 733 502 | 5/2014 |
| WO | W001057758 A1 | 9/2001 |
| WO | W02014130958 A1 | 8/2014 |

OTHER PUBLICATIONS

International Search Report and Written Opinion in International Application No. PCT/US2015/048652, dated Nov. 2, 2015, 15 pages.

(Continued)

*Primary Examiner* — David J Stoltenberg
*Assistant Examiner* — Robert C Johnson
(74) *Attorney, Agent, or Firm* — Jaffery Watson Mendonsa & Hamilton LLP

(57) ABSTRACT

Techniques and systems for beacon triggered code redemption are disclosed. Such a technique can include causing a mobile device to listen for beacon messages broadcast by a beacon device over a short-range communication link; receiving a beacon message from the beacon device; and exchanging information with a content provider to retrieve a redemption code associated with the beacon message. A beacon message can include a beacon identifier and an activity parameter specifying a code redemption action. The beacon identifier can be associated with an event that will occur, is occurring, or has occurred in the vicinity of the beacon device. The technique can further include displaying on a screen of the mobile device, a notification in regard to redeeming the redemption code configured for redeeming content associated with the event.

20 Claims, 10 Drawing Sheets

(56) References Cited

U.S. PATENT DOCUMENTS

| | | |
|---|---|---|
| 7,899,583 B2 | 3/2011 | Mendelson |
| 7,924,149 B2 | 4/2011 | Mendelson |
| 8,054,219 B2 | 11/2011 | Alizadeh-Shabdiz |
| 8,160,045 B1 | 4/2012 | Chhabra |
| 8,223,074 B2 | 7/2012 | Alizadeh-Shabdiz |
| 8,254,414 B2 | 8/2012 | Sakoda |
| 8,369,264 B2 | 2/2013 | Brachet et al. |
| 8,478,297 B2 | 7/2013 | Morgan et al. |
| 8,626,135 B1 | 1/2014 | Schilit et al. |
| 8,645,213 B2 | 2/2014 | Granbery |
| 8,831,642 B2 | 9/2014 | Moldavsky |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,204,251 B1 | 12/2015 | Mendelson |
| 9,204,257 B1 | 12/2015 | Mendelson |
| 9,317,867 B2 | 4/2016 | Johnson |
| 9,426,615 B2 | 8/2016 | Vigier et al. |
| 9,456,416 B2 | 9/2016 | Vigier et al. |
| 2003/0098892 A1 | 5/2003 | Hiipakka |
| 2003/0200489 A1* | 10/2003 | Hars ............... G06Q 30/02 714/703 |
| 2006/0104600 A1* | 5/2006 | Abrams ............ H04N 5/247 386/223 |
| 2006/0173790 A1 | 8/2006 | Park |
| 2006/0180664 A1* | 8/2006 | Barrett ............. G06Q 20/32 235/383 |
| 2008/0154735 A1 | 6/2008 | Carlson |
| 2010/0150122 A1 | 6/2010 | Berger |
| 2010/0174599 A1 | 7/2010 | Rosenblatt |
| 2010/0198614 A1 | 8/2010 | Chopra |
| 2010/0287052 A1 | 11/2010 | Minter |
| 2011/0028160 A1* | 2/2011 | Roeding ........... G06Q 30/0214 455/456.1 |
| 2011/0060652 A1* | 3/2011 | Morton ............. G06Q 30/02 705/14.58 |
| 2011/0178863 A1* | 7/2011 | Daigle ............. G06Q 30/0231 705/14.31 |
| 2011/0238514 A1 | 9/2011 | Ramalingam et al. |
| 2011/0238517 A1 | 9/2011 | Ramalingam |
| 2011/0319072 A1 | 12/2011 | Ekici |
| 2011/0320293 A1 | 12/2011 | Khan |
| 2012/0042036 A1* | 2/2012 | Lau ................. H04W 4/60 709/217 |
| 2012/0064855 A1 | 3/2012 | Mendelson |
| 2012/0290336 A1* | 11/2012 | Rosenblatt ........ H04B 5/00 705/5 |
| 2013/0032634 A1* | 2/2013 | McKirdy ........... G16H 40/67 235/375 |
| 2013/0046602 A1 | 2/2013 | Grigg |
| 2013/0094536 A1 | 4/2013 | Hui |
| 2013/0099920 A1 | 4/2013 | Song |
| 2013/0110728 A1 | 5/2013 | Kobres et al. |
| 2013/0117084 A1* | 5/2013 | Rooke ............. G06Q 30/0207 705/14.17 |
| 2013/0128786 A1 | 5/2013 | Sultan et al. |
| 2013/0159027 A1 | 6/2013 | Naor |
| 2013/0193201 A1* | 8/2013 | Bradley ........... G06Q 30/0623 235/375 |
| 2013/0210360 A1 | 8/2013 | Ljung |
| 2013/0212017 A1 | 8/2013 | Bangia |
| 2013/0281084 A1* | 10/2013 | Batada ............ H04B 5/0062 455/426.1 |
| 2013/0290106 A1* | 10/2013 | Bradley .......... G06Q 90/20 705/14.64 |
| 2013/0297422 A1 | 11/2013 | Hunter |
| 2013/0316725 A1 | 11/2013 | MacGougan |
| 2014/0025232 A1 | 1/2014 | Cuddihy |
| 2014/0025504 A1 | 1/2014 | Butler et al. |
| 2014/0058812 A1* | 2/2014 | Bender ........... G06Q 30/0209 705/14.12 |
| 2014/0058897 A1 | 2/2014 | Yang |
| 2014/0064166 A1 | 3/2014 | HomChaudhuri |
| 2014/0081720 A1 | 3/2014 | Wu |
| 2014/0089061 A1 | 3/2014 | Vitale |
| 2014/0108149 A1* | 4/2014 | Jabara ............ G06Q 30/0267 705/14.64 |
| 2014/0135042 A1 | 5/2014 | Buchheim |
| 2014/0136312 A1* | 5/2014 | Saksena .......... G06Q 30/0261 705/14.39 |
| 2014/0143139 A1 | 5/2014 | Koplovitz |
| 2014/0154984 A1 | 6/2014 | Perrin et al. |
| 2014/0207614 A1 | 7/2014 | Ramaswamy |
| 2014/0207682 A1 | 7/2014 | Wolfond |
| 2014/0214598 A1 | 7/2014 | Acker, Jr. et al. |
| 2014/0236478 A1 | 8/2014 | Mermelstein |
| 2014/0274150 A1 | 9/2014 | Marti et al. |
| 2014/0324627 A1* | 10/2014 | Haver ............. G06O 30/0639 705/26.9 |
| 2014/0324994 A1 | 10/2014 | Sun |
| 2014/0342760 A1* | 11/2014 | Moldavsky ....... G06Q 30/0261 455/456.3 |
| 2014/0358835 A1 | 12/2014 | Marti |
| 2015/0063323 A1 | 3/2015 | Sadek |
| 2015/0079942 A1 | 3/2015 | Kostka et al. |
| 2015/0120509 A1 | 4/2015 | Moring |
| 2015/0140982 A1 | 5/2015 | Postrel |
| 2015/0235486 A1 | 8/2015 | Ellis et al. |
| 2015/0278864 A1* | 10/2015 | McDevitt ......... G06Q 30/0261 705/14.58 |
| 2015/0289207 A1 | 10/2015 | Kubo |
| 2015/0294517 A1 | 10/2015 | Herrala |
| 2016/0092943 A1 | 3/2016 | Vigier et al. |
| 2016/0092966 A1 | 3/2016 | Vigier et al. |
| 2016/0094940 A1 | 3/2016 | Vigier et al. |
| 2016/0095063 A1 | 3/2016 | Vigier et al. |
| 2016/0148270 A1 | 5/2016 | Vigier et al. |
| 2016/0353463 A1 | 12/2016 | Vigier et al. |

OTHER PUBLICATIONS

U.S. Appl. No. 14/586,489, filed Dec. 30, 2014, Beacon Triggered Processes, Vigier et al.

U.S. Appl. No. 14/592,638, filed Jan. 8, 2015, Prioritizing Beacon Messages for Mobile Devices, Vigier et al.

U.S. Appl. No. 14/592,674, filed Jan. 8, 2015, Scoring Beacon Messages for Mobile Device Wake-up, Vigier et al.

U.S. Appl. No. 14/586,571, filed Dec. 30, 2014, Beacon Triggered Device to Device Content Transfer, Vigier et al.

Digital-download kiosks in store for retail, other verticals. (Jun. 24, 2009). Retrieved from https://www.kioskmarketplace.com/articles/digital-download-kiosks-in-store-for-retail-other-certicals-2/ (Year: 2009).

* cited by examiner

| Beacon Identifier 702 | Redemption Code 704 | Redemption Link 706 | Redemption Information 708 | Remaining Codes 710 | Time Criterion 712 | Location Criterion 714 |
|---|---|---|---|---|---|---|
| com.abc.concert.stage | 0x45fa3ee1 | www.mytunes.com/redeem | "Get Free Song" | 2999 | 48 Hours | n/a |
| com.abc.concert.welcomecenter | 0x0fc40ab9 | www.mytunes.com/redeem | "Get Free T-Shirt" | 500 | 24 Hours | On-site |

BEACON-TRIGGERED CODE REDEMPTION FOR MOBILE DEVICES

TECHNICAL FIELD

This disclosure relates generally to radio frequency (RF) beacons.

BACKGROUND

Many modern mobile devices (e.g., a smart phone, tablet computer, wearable computer) include one or more radio frequency receivers, transmitters, or transceivers that allow one-way or two-way communications with other devices. For example, a mobile device can use a transceiver to communicate with a server on the Internet via a base station of a wireless network. In another example, a mobile device can include a receiver to receive low powered RF signals from devices such as RF beacons.

SUMMARY

Techniques and systems for beacon-triggered code redemption are disclosed. Such techniques can include causing a mobile device to listen for beacon messages broadcast by a beacon device over a short-range communication link; receiving a beacon message from the beacon device; and exchanging information with a content provider to retrieve a redemption code associated with the beacon message. A beacon message can include a beacon identifier and an activity parameter specifying a code redemption action. The beacon identifier can be associated with an event that will occur, is occurring, or has occurred in the vicinity of the beacon device. The technique can further include displaying on a screen of the mobile device, a notification and redeeming mechanism for initiating a redemption process with the content provider.

In some implementations, a method comprises: causing a mobile device to listen for beacon messages broadcast by a beacon device over a short-range communication link; receiving, at the mobile device, a beacon message from the beacon device, the beacon message including a beacon identifier and an activity parameter, the activity parameter specifying a code redemption action, wherein the beacon identifier is associated with an event that will occur, is occurring, or has occurred in the vicinity of the beacon device; sending a request to a content provider to retrieve a redemption code associated with the code redemption action, the request including the beacon identifier; and receiving a response from the content provider, the response including the redemption code.

In some implementations, a method comprises: causing a mobile device to listen for beacon messages broadcast by beacon devices over a first short-range communication link; receiving, at the mobile device, a first beacon message from a first beacon device of the beacon devices, the beacon message including a beacon identifier and an activity parameter, the activity parameter specifying a code redemption action, where the beacon identifier is associated with an event that will occur, is occurring, or has occurred in the vicinity of the beacon device; exchanging information with a content provider to retrieve a redemption code associated with the beacon identifier, wherein the redemption code is redeemable based on satisfying one or more redemption criteria; receiving, at the mobile device, a second beacon message from a second beacon device of the beacon devices over a second short-range communication link; determining that the one or more redemption criteria are satisfied based on the second beacon message; and providing a redemption mechanism for redeeming the redemption code.

Other implementations are directed to systems, devices and computer-readable, storage mediums. Particular implementations disclosed herein provide one or more of the following advantages. Redemption codes can be provided automatically or semi-automatically. Further, redemption codes can be provided wirelessly. Thus, providing physical pieces of paper or plastic cards that have a printed or magnetically encoded redemption code can be avoided, which can reduce costs and waste.

The details of the disclosed implementations are set forth in the accompanying drawings and the description below. Other features, objects and advantages are apparent from the description, drawings and claims.

DESCRIPTION OF DRAWINGS

FIG. 7 illustrates an example database used by one or more servers associated with beacon triggered code redemption.

The same reference symbol used in various drawings indicates like elements.

DETAILED DESCRIPTION

Figure 1:
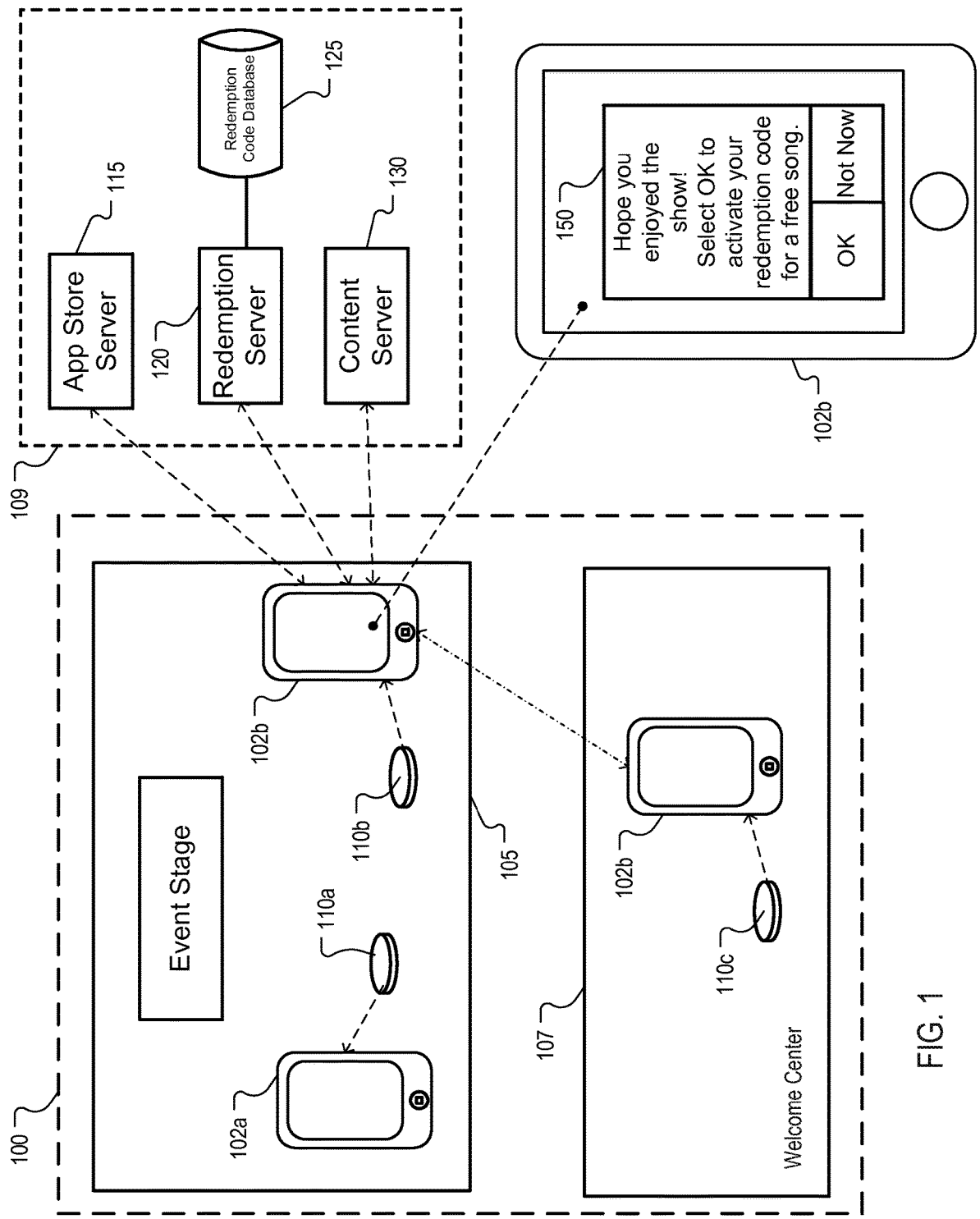
FIG. 1 illustrates an example of an operating environment including a beacon-equipped venue.

FIG. 1 illustrates an example of an operating environment 100 including a beacon-equipped venue 105. In the example shown, the venue 105 includes beacon devices 110*a-b* to enable an interactive user experience such as one with an event that will occur, is occurring or has occurred in the vicinity of the venue 105. The beacon devices 110*a-b* can broadcast beacon messages to devices such as mobile devices 102*a-b* using a short-range communication link. On the mobile devices 102*a-b*, an application that is responsive to the beacon messages can provide users of the mobile devices 102*a-b* with an interactive user experience.

In the example shown, the event can be a rock concert and the venue 105 can be a concert hall or stage. The interactive user experience can include providing redemption codes to people at the venue 105 via their mobile devices 102*a-b*. For example, a venue operator may desire to provide complimentary products or services such as a free song or beverage to people that are physically present within the venue 105, i.e., to users whose mobile devices 102*a-b* are within communication range of the beacon devices 110*a-b*. The venue operator, for example, can locate the beacon devices 110*a-b* within the venue 105 such as near a point of ingress or egress. Further, the venue operator can configure the beacon devices 110a-b to broadcast beacon messages that include information for obtaining products or services associated with the rock concert performed at the venue 105.

Responsive to a beacon message, a mobile device 102b can display a window 150 within a graphical user interface (GUI) on a screen of the mobile device 102b. The window 150 can include a notification text field containing a message regarding an offer associated with the beacon message and selection mechanisms such as an "OK" virtual button and a "Not Now" virtual button. The offer, for example, could be for a free song or a free cup of coffee. To obtain a redemption code associated with the offer, a user of the mobile device 102b can select the "OK" virtual button. Instructions for using the redemption code can be subsequently displayed. In some implementations, a redemption code can be automatically obtained after receiving a beacon message, and the window 150 can include instructional text on how to redeem the redemption code. For example, such instructional text can include "click OK to redeem code and proceed to website to download the free song." In this case, the user may be directed to an "artist" page" containing music and other content (e.g., videos) for the artist that was performing in the venue 105. In another example, such instructions can include "walk to visitor kiosk, and then click OK to display redemption code to kiosk attendant to receive your free t-shirt."

The mobile devices 102a-b can be configured to communicate with one or more content providers 109 associated with the interactive user experience. A content provider 109 can include an application store server 115, a redemption server 120, a content server 130, or a combination thereof. The application store server 115 can provide an application to the mobile devices 102a-b for interacting with the venue 105. The application can provide users of the mobile devices 102a-b an interactive experience that is responsive to reception of beacon messages from the beacon devices 110a-b. The beacon messages, for example, can include a beacon identifier and an activity parameter specifying a code redemption action. A mobile device 102b can send the redemption server 120 a request that includes the beacon identifier, the activity parameter, or both. The redemption server 120 can query a redemption code database 125 with the beacon identifier, the activity parameter, or both to retrieve information such as a redemption code, a redemption link, or both. The redemption server 120 can provide the mobile device 102b with the retrieved redemption code, redemption link, or both. In some implementations, the mobile device 102b can access content from the content server 130 based on the redemption code and the redemption link.

Moreover, the operating environment 100 can include areas such as a welcome center 107 that neighbors the venue 105. The welcome center 107 can include one or more additional beacon devices such as beacon device 110c. This beacon device 110c can have a different beacon identifier from the beacon devices 110a-b within the venue 105. In some implementations, the beacon device 110c at the welcome center 107 can be configured to cause a mobile device 102b to automatically check-in, and receive a virtual pass for entry into the venue 105. In some implementations, after receiving a redemption code associated with an event at the venue 105, a condition of the redemption code may be to visit a gift shop located at the welcome center 107. Satisfying the condition can include detecting a beacon message from a beacon device 110c that is within a vicinity of the gift shop.

The beacon devices 110a-c and the mobile devices 102a-b can use a short-range radio technology such as Bluetooth™ or a near field communication (NFC) technology for broadcasting and/or receiving beacon messages. In some implementations, the beacon devices 110a-b can use a specific type of Bluetooth™ called Bluetooth™ low energy (BTLE). A wireless communication range of the beacon devices 110a-c can be between 10 to 30 meters. Other ranges are possible. When a mobile device 102a-b is within a wireless communication range of a beacon device 110a-c, it can receive a corresponding beacon message.

Mobile devices 102a-b can be wireless devices, including smartphones, tablet computers, notebook computers, or wearable computers. In some implementations, the mobile devices 102a-b can include a wireless receiver or transceiver that can scan the vicinity for beacon messages from other devices, such as beacon devices 110a-c, in the vicinity. For example, a mobile device 102a-b can include a BTLE receiver that scans for beacon messages. The mobile devices 102a-b can communicate with servers 115, 120, 130 via a base station of a wireless network such as one based on Long Term Evolution (LTE) or Code Division Multiple Access (CDMA), e.g., CDMA2000 and Wideband CDMA (WCDMA). Other types of wireless networks are possible. In some implementations, a mobile device 102a-b can be configured to be a beacon device.

Figure 2A:
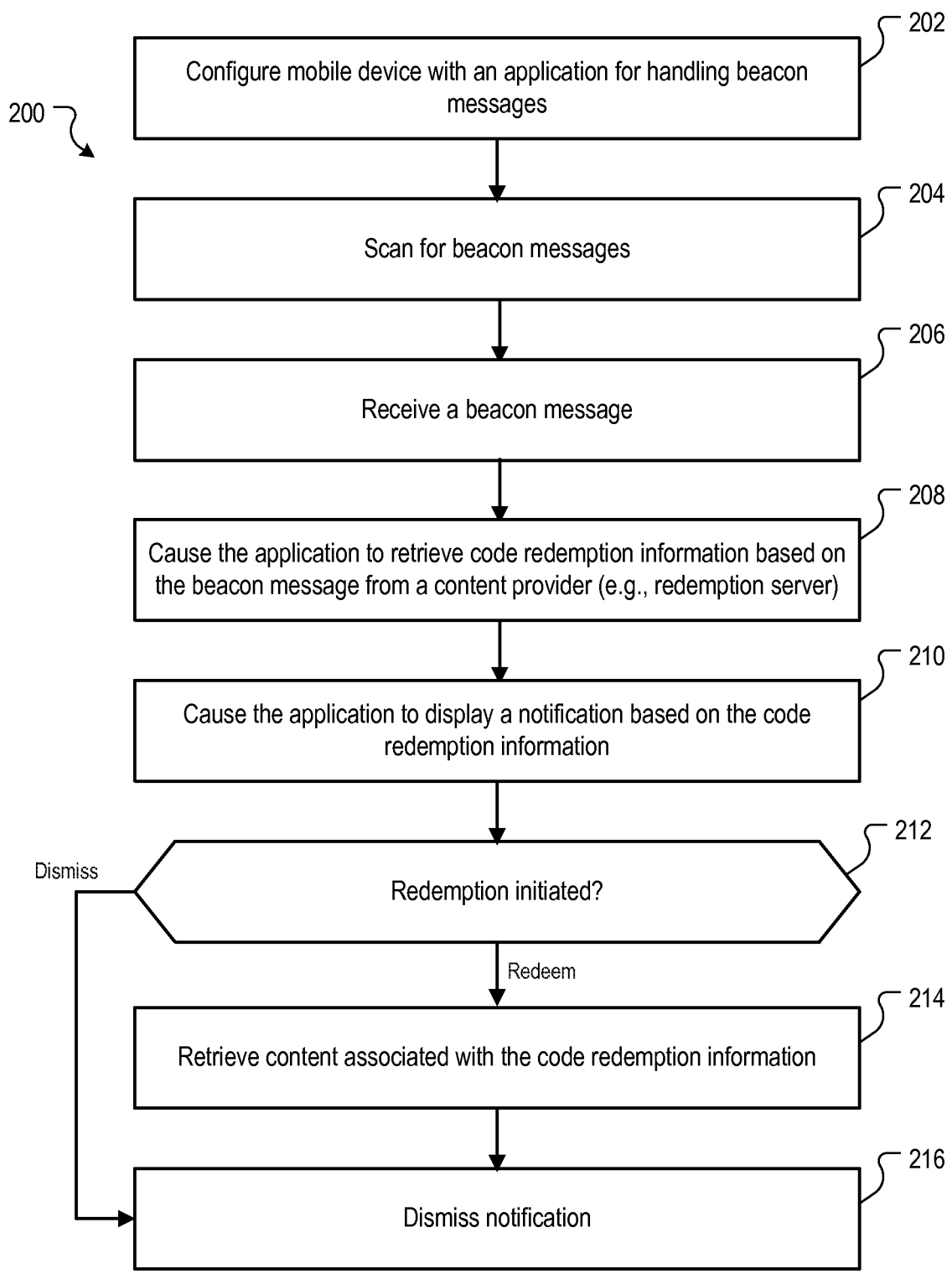
FIGS. 2A and 2B illustrate different example processes performed by a mobile device.

FIG. 2A illustrates an example process 200 performed by a mobile device. The process 200 can begin by configuring the mobile device with an application for handling beacon messages (202). In some implementations, a user can cause the mobile device to download and install an application from an application store website. For example, a user can download and install an application before entering a venue that is associated with the application.

The process 200 can scan for beacon messages (204). In some implementations, the application can, after being launched, cause the mobile device to activate a receiver or transceiver to scan for one or more types of beacon messages. Moreover, the application can register itself as a handler for one or more types of beacon messages. The process 200 can receive a beacon message (206). In some implementations, the mobile device can determine what application is registered to receive beacon messages, and, in turn, forward a received beacon message to that application.

The process 200 can cause the application to retrieve code redemption information based on the beacon message from a content provider such as a redemption server (208). Code redemption information can include a redemption code, a redemption link, redemption instructions, or a combination thereof. Other types of code redemption information are possible. In some implementations, a redemption link includes a uniform resource locator (URL) associated with a website for redeeming the redemption code. In some implementations, the process 200 can provide a notification to obtain permission before retrieving the code redemption information.

The process 200 can cause the application to display a notification based on the code redemption information (210). A notification can be displayed on a screen of the mobile device. In some implementations, the notification can be displayed on a screen while the mobile device is in a locked screen state. In some implementations, the process 200 can cause the mobile device to vibrate in addition to displaying the notification. Displaying a notification can include rendering a window on a GUI that includes one or more virtual buttons such as a redeem button and a dismiss button. In some implementations, displaying a notification can include displaying a virtual redemption button and a virtual dismiss button.

The process 200 can determine whether the redemption is initiated (212). Determining whether the redemption is initiated can include receiving a selection of either a virtual redemption button or a virtual dismiss button. In some implementations, determining which button is selected can include receiving coordinates produced by a touch-screen input device and determining whether the coordinates are within a region defined by one of the buttons. If the redemption is not initiated (e.g., dismiss button is selected), the process 200 can dismiss the notification (216). Dismissing the notification can include removing a window containing the notification. In some implementations, the notification can be saved for future use. If the redemption is initiated (e.g., redeem button is selected), the process 200 can retrieve content associated with the code redemption information (214) and dismiss the notification (216). In some implementations, retrieving content associated with the code redemption information can include launching a browser application on the mobile device.

Figure 2B:
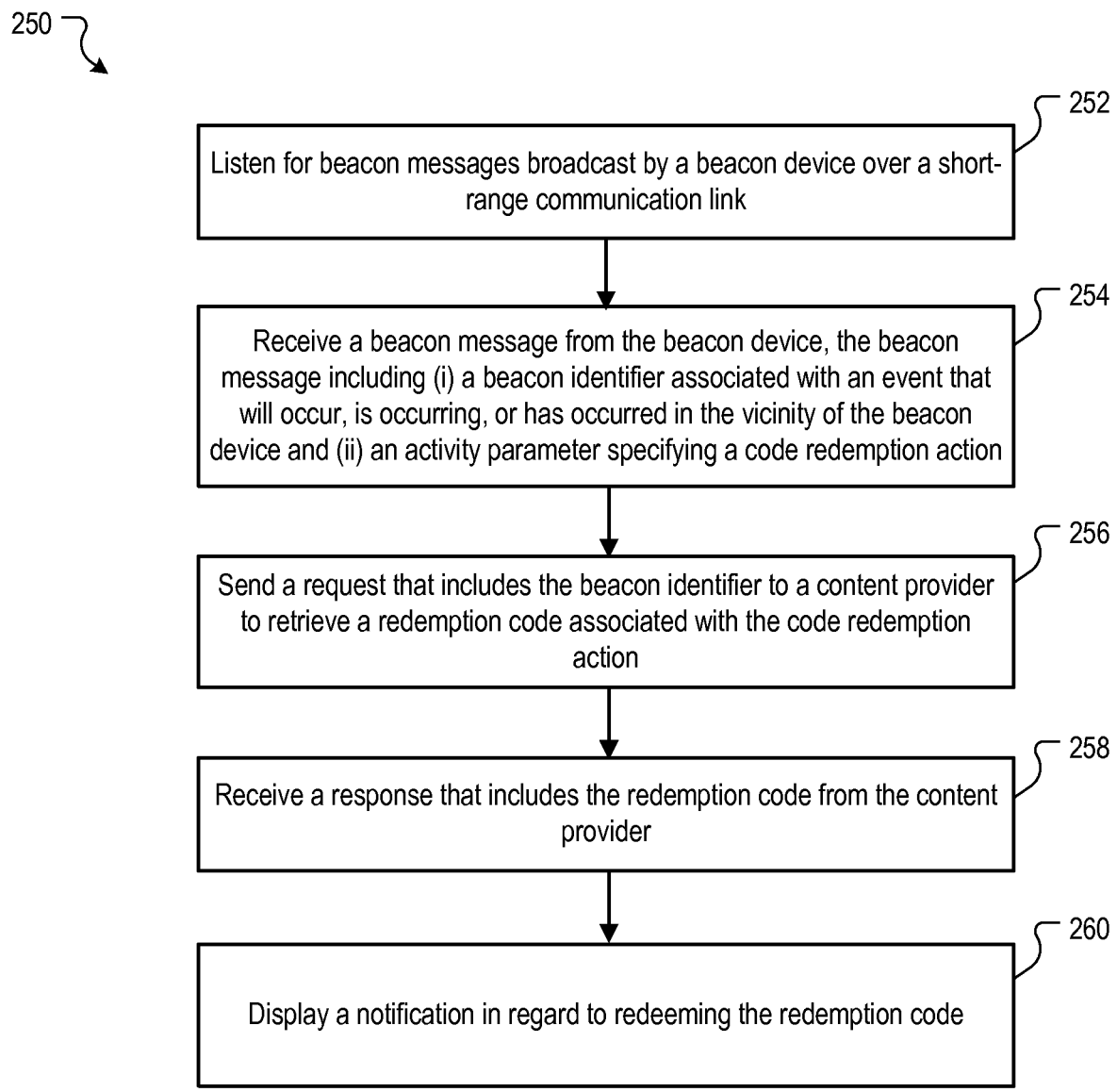

FIG. 2B illustrates another example process 250 performed by a mobile device. The process 250 can begin by listening for beacon messages broadcast by a beacon device over a short-range communication link (252). For example, the process 250 can include activating a scan for beacon devices that are in the vicinity of the mobile device. As used herein, "in the vicinity" means the mobile device is physically close enough to the beacon device to receive RF signals transmitted by the beacon device. For example, a wireless transceiver on the mobile device can initiate a short-range scan for RF signals such as BTLE RF signals.

The process 250 can receive a beacon message from the beacon device (254). A beacon message can include a beacon identifier associated with an event that is occurring or has occurred in the vicinity of the beacon device, and an activity parameter specifying a code redemption action. In some implementations, the process 250 can include launching an application that is configured to handle the beacon message. The process 250 can include forwarding at least a portion of the beacon message to the application. In some implementations, the process 250 can include determining whether an application for handling the beacon message is installed on the mobile device. If such an application is not installed on the mobile device, the application can be downloaded from an application store server. In some implementations, a user can be prompted for permission before downloading the application.

The process 250 can send a request that includes the beacon identifier to a content provider to retrieve a redemption code associated with the code redemption action (256). In some implementations, the request includes a location of the mobile device. The location can include a latitude value and a longitude value. In some implementations, user permission can be obtained before sending the request. In some implementations, a predetermined user privacy device setting is checked before sending the request.

The process 250 can receive a response that includes the redemption code from the content provider (258). In some implementations, the response can include a link (e.g., a URL) to a website for redeeming the redemption code. In some implementations, the response can include information regarding one or more redemption criteria. Redemption criteria can include a time period during which the redemption code is redeemable. Other types of criteria are possible, such as one based on location or requiring one or more additional activities, such as interacting with other beacons deployed at different locations in the operation environment.

The process 250 can display a notification in regard to redeeming the redemption code (260). The content can be related to an author or artist who generated the content and who is performing or has performed live at the event. Displaying the notification can include displaying a user-selectable redeem mechanism. In some implementations, the process 250 can include receiving user input selecting the user-selectable redeem mechanism. Various examples of user input include a touch input, audio input, or physical input such as a shake or nod of a device. Other types of input are possible. In some implementations, the process 250 can include causing, responsive to the user input, an application on the mobile device to obtain content from the content provider using a link and the redemption code, where the link is included in the response from the content provider. In some implementations, the process 250 can include causing, responsive to the user input, an application on the mobile device to display a barcode (e.g., QR code) that is based on the redemption code in order for the redemption code to be redeemed by an optical scanner. In some implementations, the process 250 can include causing, responsive to the user input, an application on the mobile device to broadcast a signal that is based on the redemption code in order for the redemption code to be redeemed by a radio frequency scanner. In some implementations, equipment such as an optical scanner or a radio frequency scanner can be connected to a point-of-sale terminal that is configured to apply the redemption code to a purchase of a product or a service.

In some implementations, the process 250 can include providing an indication on the mobile device that the redemption code is ready to be redeemed. The indication can include a force feedback (e.g., vibration indication), audio indication (e.g., beep, music, etc.), visual indication (e.g., message display), or a combination thereof. In some implementations, the redemption code can be activated based on satisfying one or more criteria, and when satisfied, the process 250 provides an indication that the redemption code is ready to be redeemed.

Figure 3A:
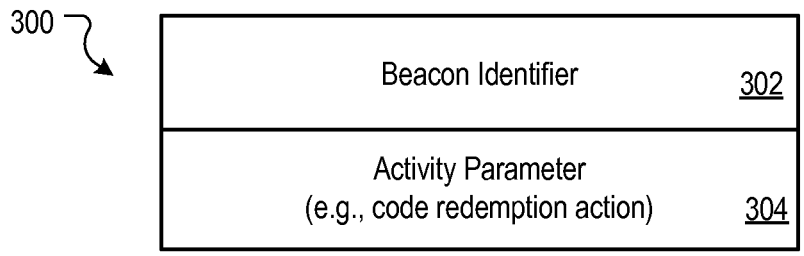
FIGS. 3A, 3B, and 3C illustrate different examples of beacon message formats.
Figure 3B:
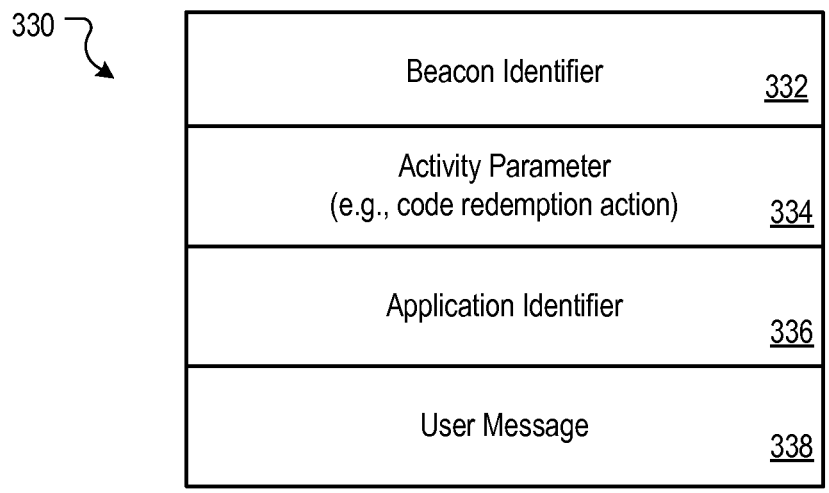
Figure 3C:
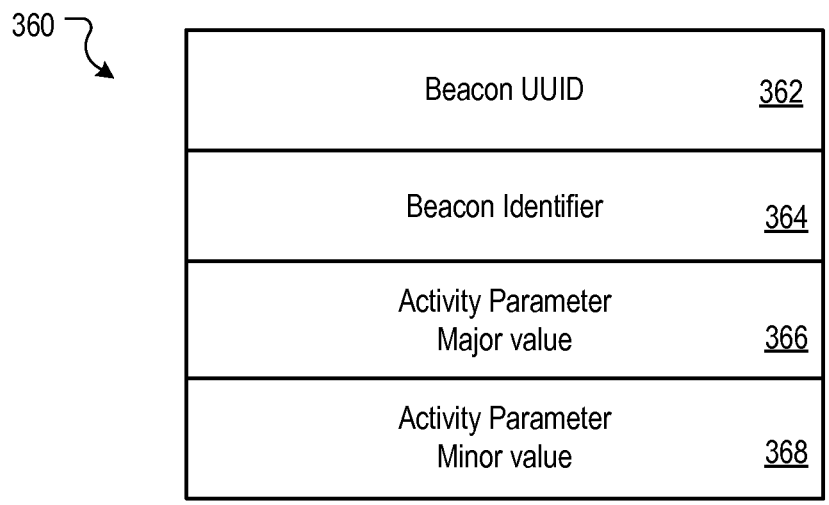

FIGS. 3A, 3B, and 3C illustrate different examples of beacon message formats. In FIG. 3A, the format 300 includes a beacon identifier 302 and an activity parameter 304. A beacon identifier 302 can include a text string such as "com.mycompany.bigevent" or a hexadecimal value such as "0x0f32de44." Other types of identifiers are possible. The activity parameter 304 can include an action value or string such as a code redemption action value or string. Other types of activity parameters are possible.

In FIG. 3B, the format 330 includes a beacon identifier 332, activity parameter 334, application identifier 336, and a user message 338. The application identifier 336 can identify an application running on the mobile device for handling the beacon message upon reception at a mobile device. For example, an operating system running on the mobile device can use the application identifier 336 to forward the beacon message to an application corresponding to the application identifier 336. In some implementations, if the application is not already installed on the mobile device, a browser can be launched on the mobile device and direct the user (e.g., using a URL) to a website where the user can download and install the application corresponding to the application identifier 336. In some implementations, the application can be downloaded automatically without user intervention in a manner that is transparent to the user (e.g., as a background process). In some implementations, if the application is installed but not running on the mobile device, the application can be launched automatically by the operating system running on the mobile device to receive the beacon message.

In FIG. 3C, the format 360 includes a beacon universally unique identifier (UUID) 362, beacon identifier 364, activity parameter major value 366, and activity parameter minor value 368. A venue can include multiple beacon devices having the same beacon identifier 364. However, such beacons can have different values for the beacon UUID 362. Thus, the beacon UUID 362 can serve to differentiate among beacon devices sharing the same beacon identifier 364 value. In some implementations, the beacon identifier 364 includes the beacon UUID 362. In some implementations, the UUID 362 is a 128-bit value.

An activity parameter can be split between a major value 366 and a minor value 368. In some implementations, the major value 366 and a minor value 368 are different 16-bit portions of a 32-bit value. In some implementations, the minor value 368 specifies a subtype from a group associated with the major value 366. For example, the major value 366 can specify a value for a redemption activity, while the minor value 368 can specify an offer code for the redemption activity. In another example, the major value 366 can specify a value associated with displaying user messages, and the minor value 368 can specify which user message to display.

In some implementations, an application running on a mobile device can process the major value 366 and the minor value 368 based on an internal database that associates major and minor values with specific actions. In some implementations, the internal database includes information from a JavaScript Object Notation (JSON) based file or data stream containing attribute-value pairs, e.g., one or more records containing a beacon identifier, major value, minor value, and an action-response such as a redemption action or information for displaying a user message. For example, a JSON based file can include the following text:

```
{
  "beaconUUID": "A3F56DB5-DFFB-48D2-C060-E0F5F81096E0",
  "beaconIdentifier": "com.music.festival",
  "beacons": [{
      "major": 1,
      "minor": 99,
      "action": "message",
      "url": "",
      "message": {
         "en": "Welcome to the Music Festival. Enjoy tonight's gig!"}
   }, {
      "major": 3,
      "minor": 2,
      "action": "url",
      "url": "https://redeem.com/us/john-smith-offer/id722410",
      "message": {
         "en": "John Smith just laid it down, and now you can pick up his hit song for free! Click OK to get it."}
   }]
}
```

This example JSON file snippet includes different actions associated with different major and minor values for a beacon UUID and identifier pair. Based on receiving a major and minor value from the beacon device associated with the beacon UUID and identifier pair, a mobile device would perform the action associated with the corresponding major and minor value entry within the JSON file.

Figure 4:
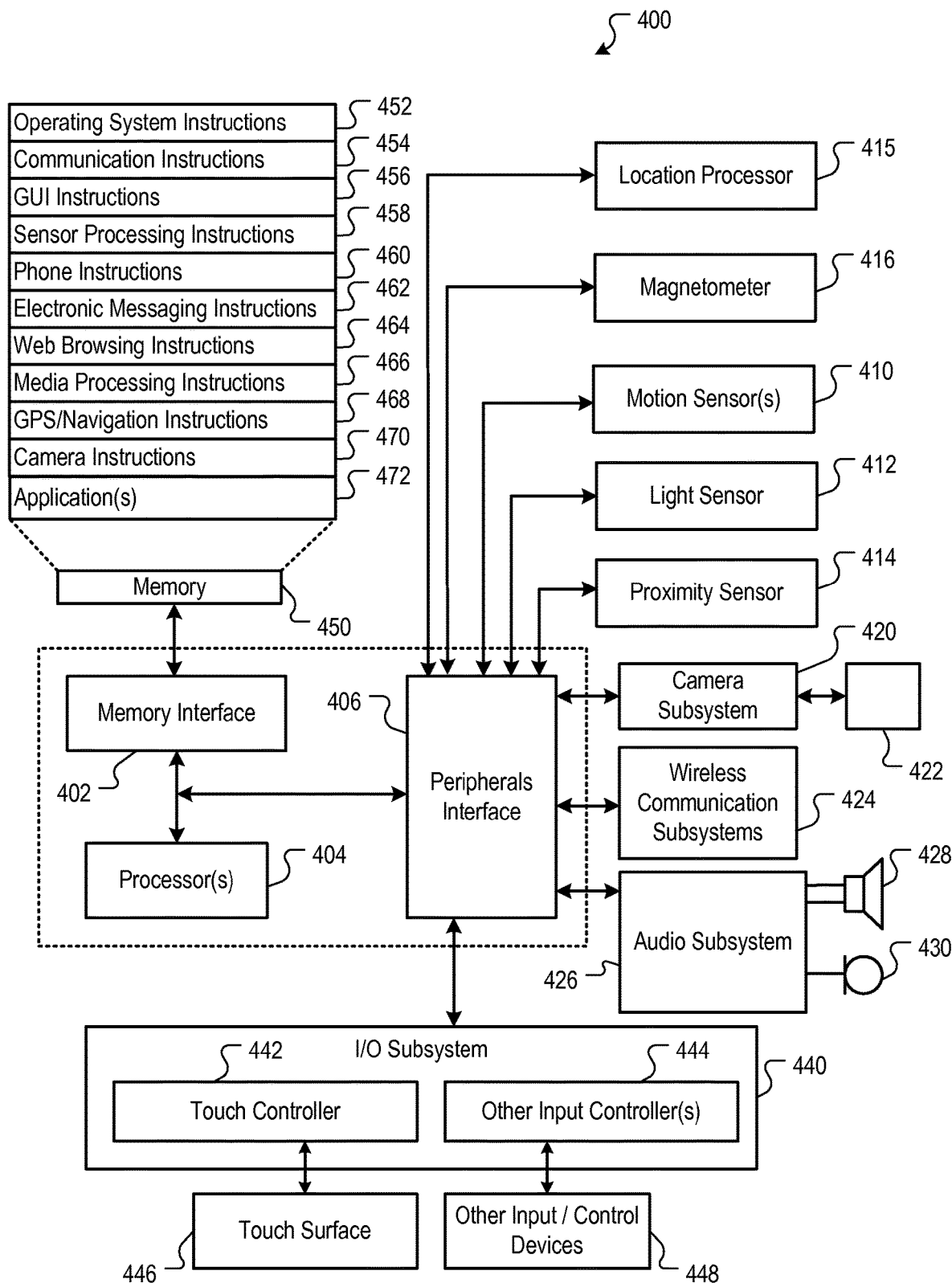
FIG. 4 is a block diagram of example device architecture for beacon triggered code redemption.

FIG. 4 is a block diagram of example device architecture for beacon triggered code redemption. The architecture may be implemented in any device 400 for generating the features described in this specification, including but not limited to portable computers, smart phones and electronic tablets, game consoles, wearable devices and the like. Device 400 may include memory interface 402, data processor(s), image processor(s) or central processor(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape). Other sensors may also be connected to peripherals interface 406, such as a temperature sensor, a biometric sensor, or other sensing device, to facilitate related functionalities. Location processor 415 (e.g., GPS receiver chip) may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass. Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. Audio subsystem 426 may be coupled to a speaker 428 and one or more microphones 430 to facilitate voice-enabled functions, such as voice recognition, voice replication, digital recording, and telephony functions.

Communication functions may be facilitated through one or more communication subsystems 424. Communication subsystems 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 424 may depend on the communication network(s) or medium(s) over which the device 400 is intended to operate. For example, a device may include wireless communication subsystems designed to operate over LTE, GSM, a GPRS network, an enhanced data GSM environment (EDGE) network, 802.x communication networks (e.g., Wi-Fi, Wi-Max), CDMA networks, NFC and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and application storage 472 for storing applications, such as an application for receiving beacon messages as described in reference to FIG. 3. In some implementations, such applications can be pre-installed on the device 400, downloaded from an application store server, or a combination thereof.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Figure 5:
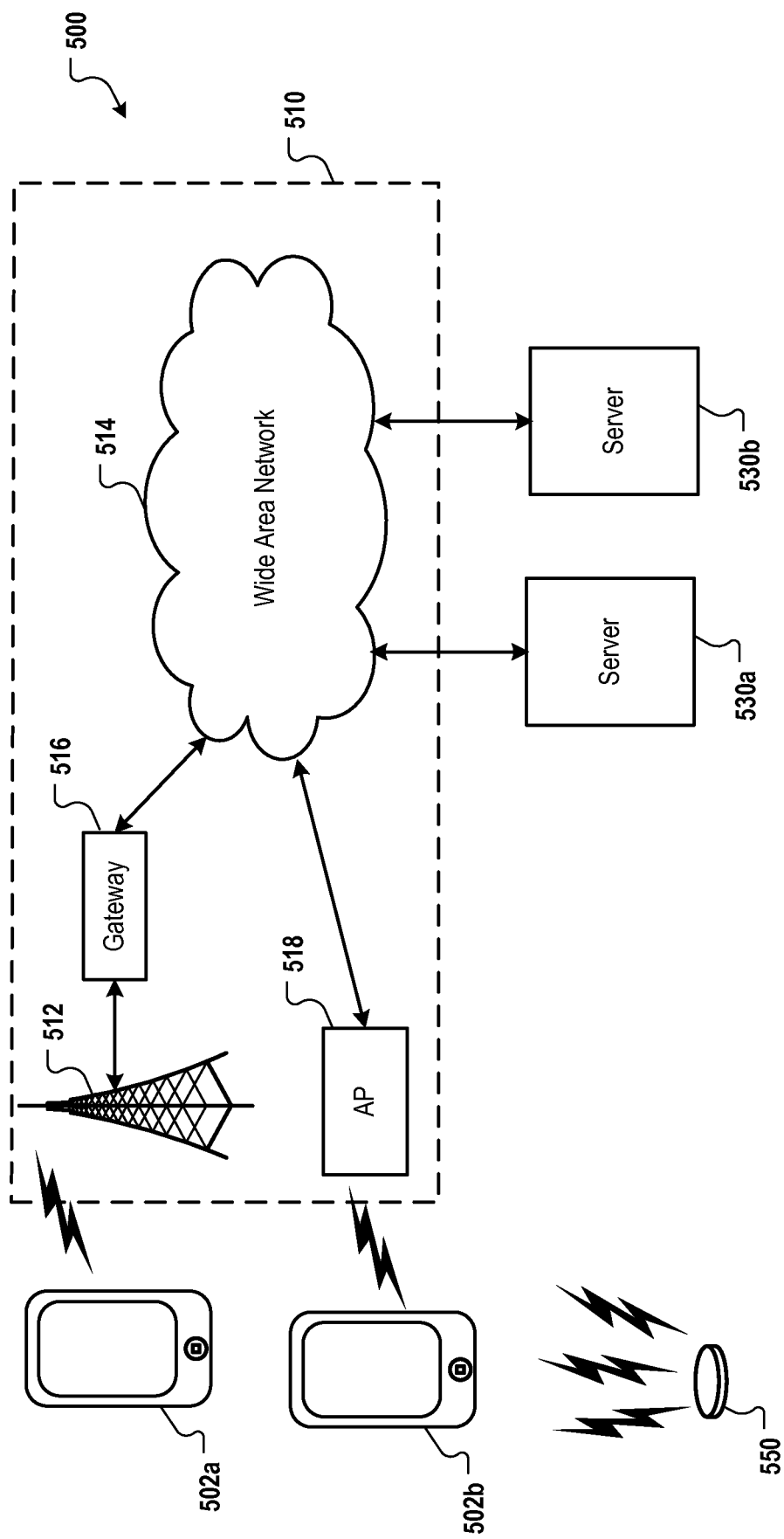
FIG. 5 illustrates an example operating environment for beacon triggered code redemption.

FIG. 5 illustrates an example operating environment for beacon triggered code redemption. Mobile devices 502a-b, for example, can communicate over one or more wireless networks. For example, a base station 512 of a wireless network, e.g., a cellular network, can communicate with a wide area network (WAN) 514, such as the Internet, by use of a gateway 516. Likewise, an access point (AP) 518, such as an IEEE 802.11 family based wireless access point, can provide communication access to the wide area network 514. The mobile device 502a-b can, for example, communicate with one or more servers 530a-b via the base station 512, access point 518, or combination thereof using a protocol such as Transmission Control Protocol/Internet Protocol (TCP/IP) or User Datagram Protocol (UDP).

Mobile devices 502a-b can also receive beacon messages over a short-range communication link from a beacon device 550. In some implementations, the short-range communication link can be based on Bluetooth radio technology. In some implementations, the short-range communication link can be based on NFC radio technology. In some implementations, the mobile devices 502a-b can be configured to continuously scan for beacon messages. In some implementations, the mobile devices 502a-b can be configured to scan for beacon messages for a predetermined time period based on an application invoking a beacon scan API. Based on receiving a beacon message over a short-range communication link from the beacon device 550, the mobile devices 502a-b can establish communications with one more servers 530a-b via a long-range communication link associated with a base station 512 that provides cellular data services. For example, a beacon message from the beacon device 550 can cause the mobile devices 502a-b to retrieve a redemption code and a redemption link from a first server 530a and download content associated with the redemption code and a redemption link from a second server 530b.

A beacon device 550 can include circuitry such as a processor, memory, transmitter for broadcasting beacon messages, and an interface for programming the beacon device 550, which can be a USB interface or a two-way wireless interface such as an LTE or IEEE 802.11 based network interface. In some implementations, the beacon device 550 can be programmed to periodically update data within the beacon messages. For example, the beacon device 550 can transmit different action codes at different times during an event, e.g., a first action code associated with a welcome message at a start of the event, and then a second action code associated with a redemption action at or near an end of the event. In some implementations, the beacon device 550 can receive an acknowledgement signal from a device receiving its beacon message, and then change its next beacon message to a different action code. In some implementations, a mobile device 502b after receiving a beacon message from the beacon device 550, can broadcast a version of the beacon message such that the beacon message is propagated to other mobile devices 502a.

Figure 6:
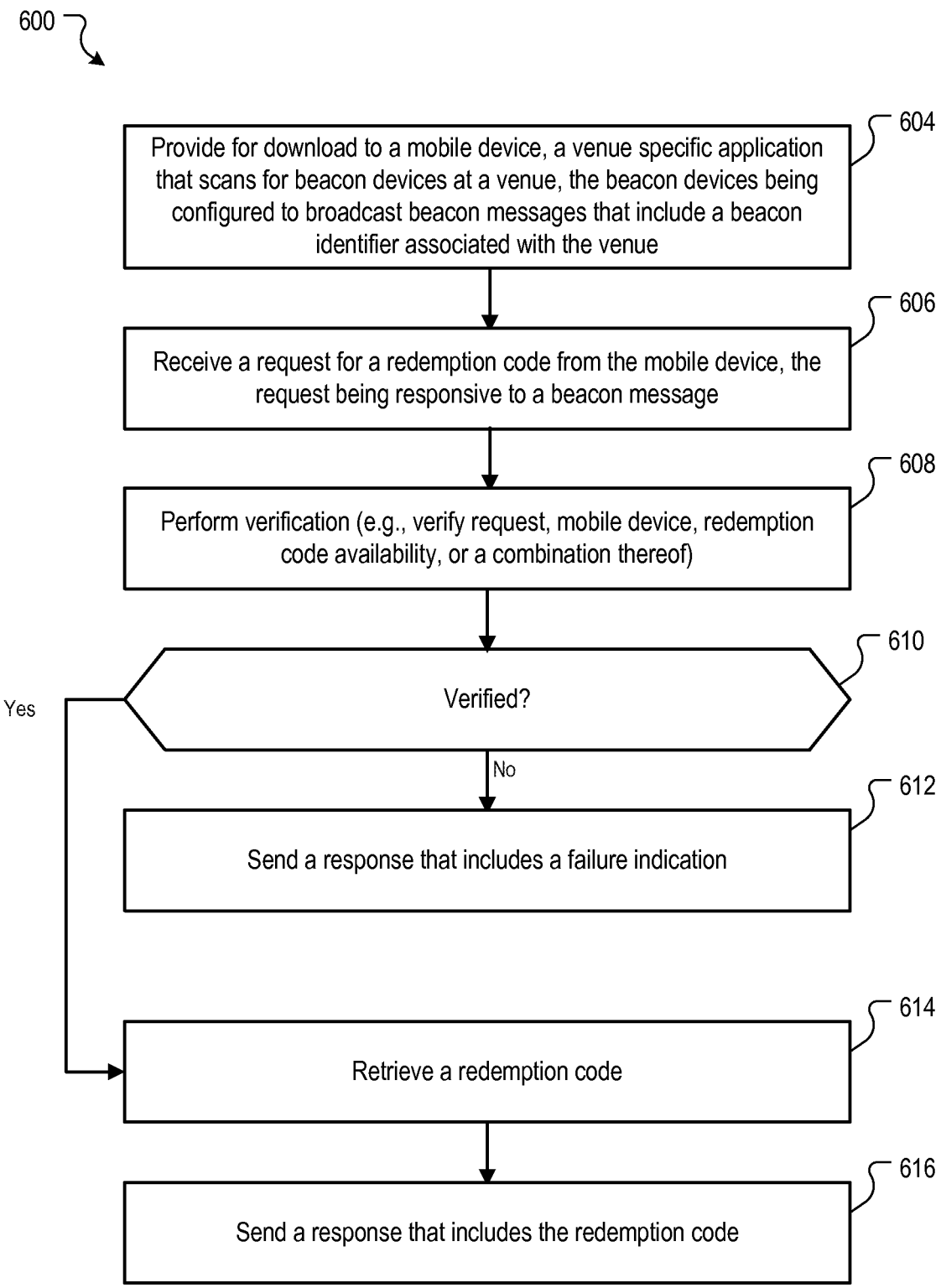
FIG. 6 illustrates an example process performed by one or more servers associated with beacon triggered code redemption.

FIG. 6 illustrates an example process 600 performed by one or more servers associated with beacon triggered code redemption. The process 600 can begin by providing for download to a mobile device, an application that scans for beacon devices at a venue (604). The beacon devices can be configured to broadcast beacon messages that include a beacon identifier associated with the venue. The process 600 can receive a request for a redemption code from the mobile device, the request being responsive to a beacon message (606). The process 600 can perform verification (608). In some implementations, a venue operator may restrict a code redemption activity to within a geographical area of the venue, and the verification can include accessing a location of the mobile device and determining whether the location corresponds to the venue. In some implementations, verification can include determining an identity of a mobile device, and determining whether the mobile device is eligible to receive a redemption code based on the identity. In some implementations, verification can include determining whether there are one or more redemption codes available for distribution. For example, a concert promoter may want to limit the number of free song downloads, and correspondingly the number of redemption codes, to a predetermined quantity. If the verification fails (610), then the process 600 can send a response that includes a failure indication to the mobile device (612). Otherwise, the verification is successful (610), and the process 600 can retrieve a redemption code (614). The process 600 can send a response that includes the redemption code to the mobile device (616). In some implementations, the response can include information regarding one or more redemption criteria. Redemption criteria include a time period during which the redemption code is redeemable (e.g., 24 hours).

FIG. 7 illustrates an example database 700 used by one or more servers associated with beacon triggered code redemption. The database 700 can include multiple tables such as tables for beacon identifiers 702, redemption codes 704, redemption links 706, redemption information 708, remaining codes 710, time criterion 712, and location criterion 714. Additional and/or different tables are possible. The database 700 can include multiple records 720*a-b* containing data elements for one or more of the tables. A redemption server, for example, can query the database 700 with a beacon identifier to retrieve a record 720*a-b* containing the beacon identifier. Retrieving a record 720*a-b* can include retrieving a redemption code. In some implementations, the redemption code is a static value, and the record 720*a-b* includes the static value, i.e., the redemption code is the same for all users. In some implementations, the redemption code in the record 720*a-b* is a pointer to another database containing a list of randomly generated codes, i.e., different redemption codes are assigned to different users, but all codes are usable to redeem the same product or service. The record 720*a-b* can include redemption information, such as a text string, that identifies an offer associated with the redemption code, identifies one or more associated restrictions, and/or redemption instructions. The record 720*a-b* can include a counter to track how many codes are remaining; the counter can be initialized to a predetermined value.

The record 720*a-b* can include one or more criteria associated with the redemption offer. For example, a time criterion can be established that controls an expiration of the offer by either a static end-time, e.g., 11:59 PM on April 25, or relative time period, e.g., 24 hours from when the code was retrieved. In some implementations, a location criterion can be established that controls a geographical restriction of the offer. A record 720*b* may be associated with an offer (e.g., for a free t-shirt) that is only available for pick-up at an on-site location within the venue, and, accordingly has a geographical restriction. In contrast, another record 720*a* may be associated with an offer for free content that is downloadable over the Internet, and may have no geographical restrictions. However, it is possible that a concert promoter may desire to place a geographical restriction for such an offer requiring that the code to be redeemed within an area centered on the venue. A redemption server can determine whether a location of a mobile device requesting a redemption code is within an area specified by a location criterion (e.g., within a defined radius) before activating and/or providing a redemption code to the mobile device.

Figure 8:
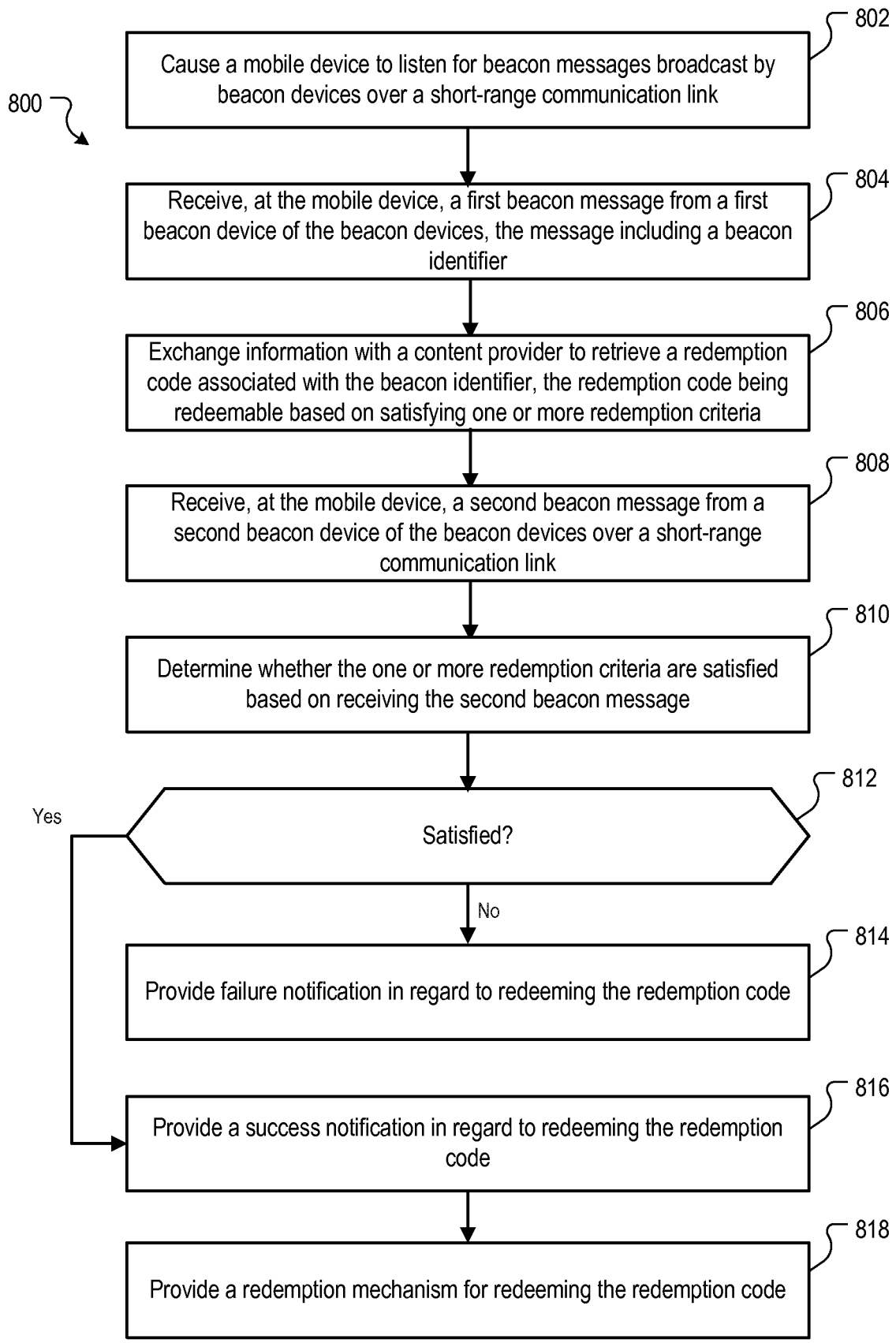
FIG. 8 illustrates an example process performed by a mobile device for beacon triggered code redemption.

FIG. 8 illustrates an example process 800 performed by a mobile device for beacon triggered code redemption. The process 800 causes a mobile device to listen for beacon messages broadcast by beacon devices over a short-range communication link (802). The process 800 receives, at the mobile device, a first beacon message from a first beacon device of the beacon devices (804). The beacon message can include a beacon identifier and an activity parameter. The activity parameter can specify a code redemption action. The beacon identifier can be associated with an event that will occur, is occurring, or has occurred in the vicinity of the beacon device. The process 800 exchanges information with a content provider to retrieve a redemption code associated with the beacon identifier (806). The redemption code can be redeemable based on satisfying one or more redemption criteria, such as a location based criterion. In some implementations, the process 800 includes causing an application on the mobile device to display a notification on a screen of the mobile device, where the notification includes information regarding the one or more redemption criteria.

The process 800 receives, at the mobile device, a second beacon message from a second beacon device of the beacon devices over a short-range communication link (808). The process 800 determines whether the one or more redemption criteria are satisfied based on receiving the second beacon message (810). Such determining can include comparing a beacon identifier of the second beacon message with a location criterion associated with a redemption code. In some implementations, such determining can include sending at least a portion of the second beacon message to the content provider. In some implementations, a satisfied determination can be ascertained if the content provider sends the redemption code, itself, or an activation notice indicating that a previously received redemption code is now redeemable. In some implementations, an unsatisfied determination can be ascertained if the content provider sends a failure code. If an unsatisfied determination results (812), the process 800 provides a failure notification in regard to redeeming the redemption code (814). If a satisfied determination results (812), the process 800 provides a success notification in regard to redeeming the redemption code (816). Providing a success notification can include displaying a success notification on the screen of the mobile device, where the success notification indicates that the redemption code is redeemable. The process 800 can provide a redemption mechanism for redeeming the code (818). Providing a redemption mechanism can include rendering a user-selectable link to a website and determining whether the link has been selected. Providing a redemption mechanism can include rendering a virtual accept button and determining whether the button has been pressed.

In some implementations, the user receives a redemption code and, after redeeming the code receives content and another redemption code that can only be redeemed when the user is physically present at a different location as detected by another beacon interaction at the different location. For example, a user can receive a redemption code based on a first interaction with a first beacon deployed at the exit of a venue where the rock concert has just been performed. Users exiting the venue interact with a first beacon, and through the interaction process previously described, receive a first redemption code for a free gift. When the user redeems the free gift from the content provider, the user also receives a second redemption code with instructions that the user can only redeem the second redemption code at a second location (e.g., a gift shop). A user interaction with a second beacon deployed at the second location (e.g., entrance of the gift shop) can confirm that the user was physically present at the second location, thus allowing the user to redeem the second redemption code at the second location. For example, the second redemption code can be a bar code that can be scanned at the second location using an optical scanner. In this manner, a chain of related redemption codes can be used to encourage users to visit other locations and potentially provide additional marketing opportunities for content providers and retail partners.

Figure 9A:
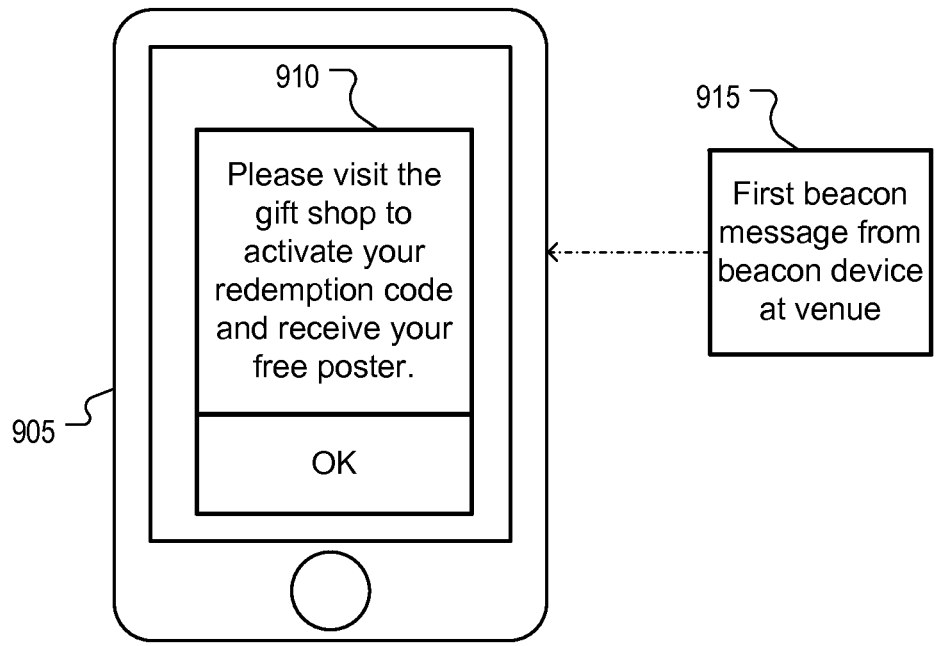
FIGS. 9A and 9B illustrate an example of notifications associated with the process of FIG. 8.
Figure 9B:
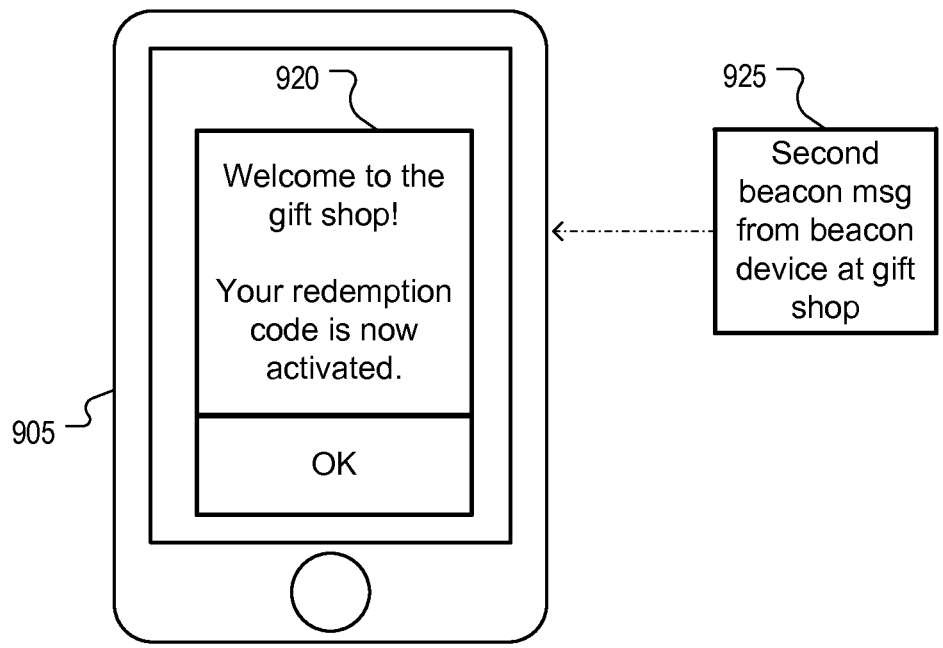

FIGS. 9A and 9B illustrate an example of notifications associated with the process of FIG. 8. Turning to FIG. 9A, a mobile device 905 can display a window 910 within a GUI on a screen of the mobile device 905 that is responsive to a first beacon message 915 transmitted by a beacon device at a venue. The window 910 can include a notification text field containing a message regarding an offer associated with the first beacon message 915 and a selection mechanism such as an "OK" virtual button. The window 910 can include offer details such as instructions for activating and/or using the redemption code. The offer, in this example, is for a free product contingent upon a visit to a gift shop at the venue. If the user selects the "OK" virtual button, a record of the acceptance of beacon message 915 is stored on the mobile device 905. Other information regarding the interaction with the venue beacon can also be stored, such as, for example, a beacon identifier, timestamp and location of the mobile device 905 (e.g., provided by GPS of the mobile device 905).

Turning to FIG. 9B, once the mobile device 905 is within the vicinity of the gift shop, it can detect a second beacon message 925 being transmitted by a beacon device located at the gift shop. Note that, in this example, the mobile device 905 can only detect the second beacon message 925 when in the vicinity of the gift shop. Upon detection of the second beacon message 925, the mobile device 905 can use the record to verify that the beacon message 915 was received and accepted by the user of the mobile device 905. For example, an application or operating system running on the mobile device 905 can examine the record to verify that the beacon message 915 was accepted and that any redemption criteria was fulfilled by the user of the mobile device 905. If the record is successfully verified and all redemption criteria was fulfilled by the user, the mobile device 905 can display another window 920 on the screen of the mobile device 905 that is responsive to the second beacon message 925. The window 920 can include a notification text field containing a message that acknowledges being at the gift shop and that the redemption code is now activated. The window 920 can include a redemption mechanism such as an "OK" virtual button. In some implementations, the verification of the record can take place when the user attempts to redeem the code (presses the "OK" virtual button) rather than upon detection of the second beacon message 925. If the record cannot be verified, window 920 can indicate such and optionally provide instructions on how to cure the verification failure.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

causing a mobile device to listen for beacon messages broadcast by a beacon device over a short-range communication link;

receiving, at the mobile device, a beacon message from the beacon device, the beacon message including a beacon identifier and an activity parameter, the activity parameter specifying a code redemption action that provides information about retrieving a redemption code, wherein the beacon identifier is associated with an event in a vicinity of the beacon device;

sending, by the mobile device, a request to a content provider to retrieve the redemption code associated with the code redemption action, the request including the beacon identifier;

receiving, by the mobile device, a response from the content provider, the response including the redemption code and one or more redemption criteria to be satisfied to redeem the redemption code;

displaying, by the mobile device and on a screen of the mobile device, a notification that is based on the response;

determining, by the mobile device, that the one or more redemption criteria have been satisfied; and in response to determining, by the mobile device, that the one or more redemption criteria have been satisfied:
activating, by the mobile device, the redemption code, and
providing, by the mobile device, an indication that the redemption code is ready to be redeemed.

2. The method of claim 1, wherein displaying on the screen of the mobile device, the notification that is based on the response comprises displaying a user-selectable redeem mechanism.

3. The method of claim 2, wherein the response includes a link to a website for redeeming the redemption code.

4. The method of claim 2, comprising:

receiving user input selecting the user-selectable redeem mechanism associated with the notification; and responsive to the user input, causing an application on the mobile device to obtain content from the content provider using the link and the redemption code.

5. The method of claim 1, comprising:
receiving content from the content provider over a communication link that is different from the short-range communication link.

6. The method of claim 5, wherein the content is related to an author or artist who generated the content and who is performing or has performed live at the event.

7. The method of claim 1, comprising:
obtaining a location of the mobile device; and
including the location in the request.

8. The method of claim 1, wherein the short-range communication link is based on Bluetooth radio technology.

9. The method of claim 1, comprising:
determining that an application for handling the beacon message is installed on the mobile device;
downloading the application if the application is not installed on the mobile device;
forwarding at least a portion of the beacon message to the application; and
launching, after the determining, the application.

10. The method of claim 1, wherein the indication that the redemption code is ready to be redeemed includes force feedback, audio indication, visual indication, or a combination thereof.

11. The method of claim 1, wherein the redemption code is a barcode.

12. The method of claim 1, comprising:
broadcasting a signal that is based on the redemption code in order for the redemption code to be redeemed by a radio frequency scanner.

13. The method of claim 1, comprising:
broadcasting, from the mobile device, a version of the beacon message such that the beacon message is propagated to other mobile devices within a communication range of the mobile device.

14. A method comprising:
causing a mobile device to listen for beacon messages broadcasted by beacon devices over a first short-range communication link;
receiving, at the mobile device, a beacon message from a first beacon device of the beacon devices, the beacon message including a beacon identifier and an activity parameter, the activity parameter specifying a code redemption action that provides information about retrieving a redemption code, wherein the beacon identifier is associated with an event in a vicinity of the beacon device;
determining that an application for handling the first beacon message is installed on the mobile device;
downloading the application if the application is not installed on the mobile device;
forwarding at least a portion of the first beacon message to the application;
exchanging, by the application, information with a content provider to retrieve the redemption code associated with the beacon identifier, wherein the redemption code is redeemable based on satisfying one or more redemption criteria;
displaying, by the mobile device and on a screen of the mobile device, a notification that is based on the response;
receiving, at the mobile device, a second beacon message from a second beacon device of the beacon devices over a second short-range communication link;
determining that the one or more redemption criteria are satisfied based on the second beacon message; and
providing a user-selectable redemption mechanism for redeeming the redemption code in response to determining that the one or more redemption criteria are satisfied.

15. The method of claim 14, comprising:
displaying a first notification on a screen of the mobile device, the first notification including information regarding the one or more redemption criteria,
displaying a second notification on the screen of the mobile device, the second notification indicating that the redemption code is redeemable, the second notification being associated with the redemption mechanism.

16. The method of claim 14, wherein the determining comprises sending at least a portion of the second beacon message to the content provider.

17. The method of claim 16, wherein the determining comprises receiving the redemption code from the content provider if the one or more redemption criteria are satisfied.

18. The method of claim 14, wherein the short-range communication link is based on Bluetooth radio technology.

19. The method of claim 1, wherein the code redemption action comprises a value or string.

20. The method of claim 1, wherein the code redemption action comprises a major value and a minor value, wherein the major value comprises a value for a redemption activity and the minor value specifies a subtype from a group associated with the major value.

* * * * *